(No Model.)
A. F. BORLAND.
FUNNEL.
No. 578,540. Patented Mar. 9, 1897.
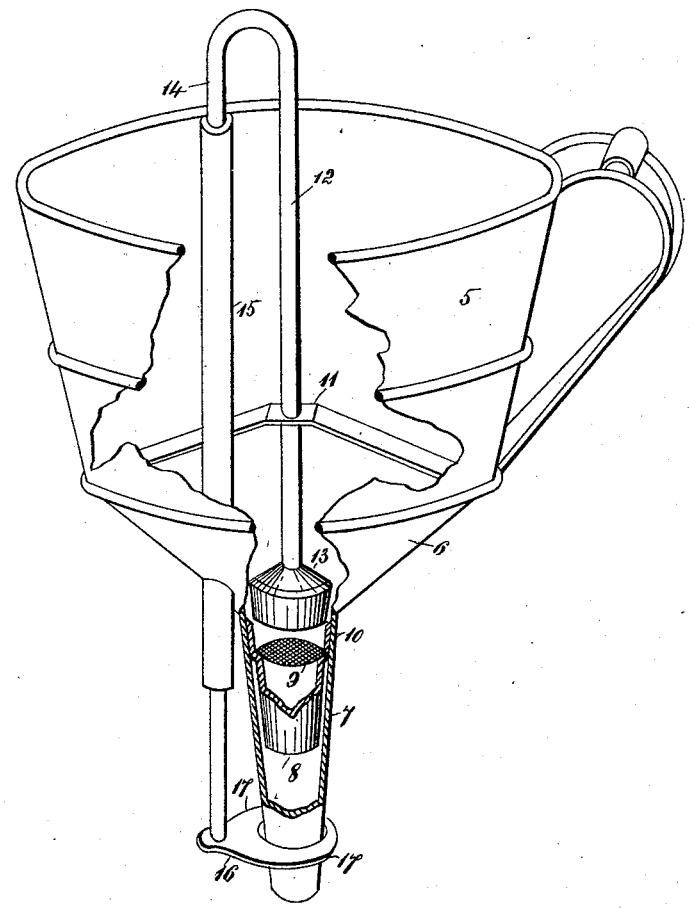
WITNESSES
John Buckler,
Charles S. Rogers
INVENTOR
Anson F. Borland
BY
Edgar Tate & Co
ATTORNEYS

UNITED STATES PATENT OFFICE.

ANSON F. BORLAND, OF WINNIPEG, CANADA.

FUNNEL.

SPECIFICATION forming part of Letters Patent No. 578,540, dated March 9, 1897.

Application filed June 18, 1896. Serial No. 595,998. (No model.)

*To all whom it may concern:*

Be it known that I, ANSON F. BORLAND, a subject of the Queen of England, and a resident of Winnipeg, in the county of Selkirk and Dominion of Canada, have invented certain new and useful Improvements in Funnels, of which the following is a specification, reference being had to the accompanying drawing, forming a part thereof, in which similar numerals of reference indicate corresponding parts.

This invention relates to funnels such as are usually employed in filling bottles, jugs, jars, and similar vessels; and the object thereof is to provide an improved device of this class in which a funnel of ordinary form is employed, said funnel being provided with a handle and with a discharge-spout, and in my invention I place in said discharge-spout a supplemental tube the top of which is provided with a screen or strainer, and said funnel is also provided with a vertically-movable valve which is adapted to close the upper end of the spout and to be raised from its seat when the discharge-spout of the funnel is inserted into the vessel to be filled and to be seated so as to close the vessel or opening through said discharge-spout on the instant the funnel is raised.

The invention is fully disclosed in the following specification, of which the accompanying drawing forms a part, said drawing being a perspective view of my improved funnel, with part of the body portion thereof broken away, so as to show the construction, and a part of the discharge-spout being also shown in section.

In the practice of my invention I provide a body portion 5, which is of the usual form and construction, said body portion being larger at the top than at the bottom and the bottom thereof being conical in form, as shown at 6, the apex thereof being directed downwardly, and secured thereto or formed thereon is a discharge-spout which is also preferably slightly conical in form, the lower end thereof being of less diameter than the upper end. I also place in the discharge-spout a supplemental tube 8, in which is placed a screen or strainer 9, and the upper end of said discharge-spout above said screen or strainer is so formed as to constitute a valve-seat, as shown at 10.

Secured within the body portion of the funnel is a transverse plate or bar 11, the central portion of which is preferably upwardly curved, and passing vertically therethrough and movable therein is a valve-rod 12, the lower end of which is provided with a valve 13, which is adapted to be seated on the valve-seat 10, so as to close the opening or passage through the tube 8, and said valve-rod is carried upwardly above the top of the funnel and bent downwardly, so as to form an arm 14, which is parallel or substantially so with the main valve-rod 12, and said arm 14 passes through a vertical tube 15, which is secured in the bottom of the funnel, and the lower end of the arm 14 is provided with a plate 16, having segmental jaws 17, which are adapted to inclose the discharge-spout 7 of the funnel, or I may substitute for the plate 16 a yoke or similar device.

Whenever it is desired to fill a bottle, jug, jar, or other vessel, the lower end of the discharge-spout 7 of the funnel is inserted into the neck thereof, and the upper end of the neck strikes the plate 16, thus forcing the valve-rod upwardly and the valve 13 off from the valve-seat 10, when the liquids with which it is desired to fill the bottle are poured into the funnel in the usual manner and pass downwardly through the tube 8 and through the discharge-spout 7 in the usual manner, and the screen or strainer 9 is designed to catch thereon all foreign substances and to prevent the passage thereof into the vessel, and when the vessel is filled all that is necessary is to raise the funnel, when the valve 13 will at once drop upon its seat and close the passage into and through the tube 8 of the discharge-spout 7.

By means of this device a bottle or similar vessel may be filled without spilling any of the contents thereof, any amount of the fluids or liquids not required to fill said vessel being retained in the funnel, and said fluids or liquids may be decanted into the vessel from which they were taken.

It will be understood that the arm 14 of the valve-rod 12 is free to move in the vertical tube 15, and the tube 8 is detachable from the discharge-spout 7, may be removed therefrom and cleaned whenever desired, and the screen or strainer 9 may also be removed and cleaned, and any form of attachment which will serve the purpose may be substituted for the plate 16, all that is necessary in this connection being to provide a device which will strike the neck of the bottle or vessel to be filled when the discharge-spout 7 is inserted thereinto and operate to raise the valve.

Two or more of the cross plates or bars 11 may be provided, if desired, and other changes in and modifications of the construction herein described may be made without departing from the spirit of my invention or sacrificing its advantages.

Having fully described my invention, I claim as new and desire to secure by Letters Patent—

1. A funnel of the usual form, provided with a discharge-spout, the upper end of which is adapted to be closed by a vertically-movable valve, a vertically-movable rod mounted in said funnel, and provided with a valve, and at its upper end with an arm which is connected therewith, and which extends downwardly parallel therewith, and which passes through a vertical tube secured in the funnel, and which projects through the bottom thereof, said arm being provided at its lower end with an attachment which is adapted to strike the neck of the bottle or other vessel to be filled when the discharge-spout of the funnel is inserted thereinto, said spout being also provided at its upper end with a detachable tube, in which is placed a screen or strainer, and the upper end of which fits within said spout, and is adapted to be closed by the valve, substantially as shown and described.

2. A funnel of the usual form and provided with a discharge-spout, the upper end of which is adapted to be closed by a vertically-movable valve, a vertically-movable rod mounted in said funnel, and provided with a valve and at its upper end with an arm which is connected therewith, and which extends downwardly parallel therewith, and which passes through a vertical tube secured in the funnel, and which projects through the bottom thereof, said arm being provided at its lower end with an attachment, which is adapted to strike the neck of the bottle or vessel to be filled when the discharge-spout of the funnel is inserted thereinto, said spout being also provided at its upper end with a detachable tube, in which is placed a screen or strainer, and the upper end of which fits within said spout, and is adapted to be closed by said valve, said valve-rod being passed through and vertically movable in a cross-bar plate arranged within said funnel, substantially as shown and described.

In testimony that I claim the foregoing as my invention I have signed my name, in presence of the subscribing witnesses, this 30th day of May, 1896.

ANSON F. BORLAND.

Witnesses:
J. D. MORICE,
R. E. YOUNG.